(12) United States Patent
Braun et al.

(10) Patent No.: US 7,541,744 B2
(45) Date of Patent: Jun. 2, 2009

(54) ELECTRONIC BALLAST FOR A HIGH-PRESSURE DISCHARGE LAMP HAVING A CURRENT-MEASURING DEVICE

(75) Inventors: Alois Braun, Neuburg (DE); Walter Limmer, München (DE); Joachim Mühlschlegel, Gröbenzell (DE); Markus Ziegler, Schaumburg, IL (US)

(73) Assignee: Osram Gesellschaft mit Beschraenkter Haftung, Munich (DE)

( * ) Notice: Subject to any disclaimer, the term of this patent is extended or adjusted under 35 U.S.C. 154(b) by 0 days.

(21) Appl. No.: 11/346,159

(22) Filed: Feb. 3, 2006

(65) Prior Publication Data

US 2006/0186828 A1    Aug. 24, 2006

(30) Foreign Application Priority Data

Feb. 24, 2005  (DE)  ........................ 10 2005 008 483

(51) Int. Cl.
    *H05B 39/04*    (2006.01)
(52) U.S. Cl. .................... 315/209 R; 315/291; 315/224; 315/360
(58) Field of Classification Search ............. 315/209 R, 315/307, 224, 308, 244, 225, 291, DIG. 5, 315/185 R, 219, 247, 360, 362
    See application file for complete search history.

(56) References Cited

U.S. PATENT DOCUMENTS

| 4,987,347 | A | * | 1/1991 | Leskovec et al. ......... 315/209 R |
| 5,117,161 | A | * | 5/1992 | Avrahami .................... 315/226 |
| 5,396,155 | A | * | 3/1995 | Bezdon et al. .............. 315/291 |
| 5,461,287 | A | * | 10/1995 | Russell et al. ........... 315/209 R |
| 5,615,100 | A | * | 3/1997 | Radecker et al. ............... 363/97 |
| 5,726,537 | A | * | 3/1998 | Huber et al. ................. 315/311 |
| 5,747,941 | A | * | 5/1998 | Shackle et al. .............. 315/224 |
| 5,982,113 | A | * | 11/1999 | Crouse et al. ............... 315/291 |
| 6,023,132 | A | * | 2/2000 | Crouse et al. ............... 315/307 |
| 6,181,079 | B1 | * | 1/2001 | Chang et al. ................ 315/247 |
| 6,278,245 | B1 | * | 8/2001 | Li et al. ...................... 315/307 |
| 6,359,387 | B1 | * | 3/2002 | Giannopoulos et al. ....... 315/46 |
| 6,400,095 | B1 | * | 6/2002 | Primisser et al. ............ 315/224 |
| 6,518,712 | B2 | * | 2/2003 | Weng ...................... 315/209 R |
| 6,856,096 | B1 | * | 2/2005 | Choudhury ................. 315/119 |
| 6,933,681 | B2 | * | 8/2005 | Rudolph ..................... 315/219 |
| 6,936,973 | B2 | * | 8/2005 | Parra et al. ............. 315/209 R |
| 7,098,605 | B2 | * | 8/2006 | Oh .............................. 315/291 |
| 2006/0152169 | A1 | * | 7/2006 | Lurkens ...................... 315/244 |

* cited by examiner

Primary Examiner—Douglas W. Owens
Assistant Examiner—Chuc Tran

(57) ABSTRACT

The invention relates to an electronic ballast and to an operating method for high-pressure discharge lamps. During a current measurement, in particular for current regulation, only switching phases of a specific polarity of the current are taken into consideration.

8 Claims, 2 Drawing Sheets

ELECTRONIC BALLAST FOR A HIGH-PRESSURE DISCHARGE LAMP HAVING A CURRENT-MEASURING DEVICE

FIELD OF THE INVENTION

The invention relates to electronic ballasts for high-pressure discharge lamps and corresponding operating methods.

BACKGROUND OF THE INVENTION

The operation of high-pressure discharge lamps using electronic ballasts is conventional per se. Such ballasts contain converters, often half-bridge converters having two switching transistors and full-bridge converters having four switching transistors. During continuous operation of the lamp, these converters produce, in simple terms, DC voltage supply powers for the lamp which alternate in terms of their polarity at a low frequency. In this case, with pure DC operation, interference phenomena occurring in the lamp as a result of the asymmetry are avoided, but at the same time higher frequencies which are likewise interference are largely kept away from the lamp.

It is also known to measure the lamp current in the case of such ballasts, for example in order to supply a safety shut-down, in the event of specific threshold values being exceeded or undershot, or a regulating circuit for the purpose of regulating the lamp current or the lamp power with a corresponding signal. During operation of the converter, switching phases of alternating polarity of the currents through the switching transistors result, such that various solutions are documented in the prior art for dealing with the resulting polarity change in the measured current signal.

SUMMARY OF THE INVENTION

The invention is based on the technical problem of specifying an electronic ballast for operating a high-pressure discharge lamp and a corresponding operating method, in which current measurements can be carried out in a favorable manner.

The invention firstly relates to an electronic ballast for operating a high-pressure discharge lamp having a converter having at least two switching transistors for the purpose of producing a supply power for the lamp using a switching operation for the switching transistors having switching phases of alternating polarity of the currents through the lamp, characterized by a current-measuring device having a measuring resistor, which is connected in series with at least one of the switching transistors and is designed to carry out current measurements only during switching phases of the converter with precisely one of the polarities, and to a corresponding illumination device having such a ballast and a suitable high-pressure discharge lamp and finally to a corresponding operating method for operating the high-pressure discharge lamp.

Individual features of preferred embodiments relate implicitly both to the apparatus aspect and the method aspect of the invention, without a specific distinction explicitly being drawn between these aspects.

The basic idea of the invention consists in avoiding the technical complexity known in the prior art for current measurements with alternating current polarity by measurements only being carried out in switching phases of a specific polarity. It is thus possible for the current to be measured in a simple manner using a measuring resistor with otherwise little complexity as regards the evaluation.

It has been shown that more or less continuous current measurement is not actually necessary for many applications, and the technical complexity required for this purpose as regards the polarity change results in solutions which are unnecessarily complex and expensive. The converter circuits in question here show a stability which is sufficient for the typical commutation frequencies of high-pressure discharge lamps and for the resulting switching phase lengths, which means that an intermittent current-measuring mode is practicable.

The invention has proven to be particularly successful for a half-bridge converter having two switching transistors. The high-pressure discharge lamp is in this case connected to the center tap between the two switching transistors and is preferably capacitively connected with its other connection to at least one of the supply potentials of the half-bridge converter. The capacitive coupling means that a potential is essentially set across this lamp connection which is midway between the two supply potentials of the half-bridge converter. The capacitive coupling in this case has the advantage of having a "self-returning" effect in the event of asymmetries owing to a discrepancy between the intermediate potential and the midpoint between the supply potentials, i.e. to a certain extent of having a balancing effect as regards the lamp operation. This is advantageous in conjunction with the lamp current measurement which is carried out in specific switching phases, i.e. is asymmetrical as regards the polarity.

The converter is preferably digitally controlled, i.e. the signals for switching the switching transistors on and off are brought about by a digital circuit. A programmable microcontroller is preferably used for this purpose.

In addition, the invention, in particular in the case of digital control, is geared towards applications using current or power regulation. In this case, the regulating circuit, in the case of digital control, is part of this digital control. The digital converter controller may in this case in particular control using the duty ratio, i.e. the relative duration of the switching phases.

Within the previously mentioned switching phases of the converter for polarity commutation in the lamp, the converter may also be designed to match the output voltage for the supply of the lamp to the lamp, i.e. specifically to decrease it. The preferred embodiment of the invention is therefore operated, in addition to the half-bridge function (for example 60 Hz-400 Hz), which is responsible for polarity commutation, as a step-down converter in each case within a switch-on phase of one of the two switching transistors by means of an intermittent switching operation of this switching transistor. The lamp inductor which is necessary in any case may in this case act as the inductance of the step-down converter.

This may take place in particular in combination with a step-up converter, which is connected upstream of the half-bridge converter, as a power factor correction circuit. The step-up converter is a particularly simple and efficient option for a power factor correction circuit, but has the disadvantage compared with other, more complex power factor correction circuits that it can only produce voltages above the peak of the power supply system voltage. This means that the center tap of the half-bridge converter oscillates with this voltage shift i.e. the lamp sees half of this voltage shift as the supply voltage amplitude. This value may be too great for continuous operation of a high-pressure discharge lamp, for which reason the abovementioned step-down converter function is used.

Within the switching phases used for the current measurement, this current measurement then moreover takes place within the switch-on phases (in relation to the step-down converter operation) of the relevant switching transistor. The measured current values can then be converted to the actual lamp current owing to the known temporal parameters of the step-down converter operation (i.e. taking into account the saw-tooth-shaped current/time integrals).

In conjunction with the abovementioned current regulating circuit or power regulating circuit or in other uses of the measured current value, reference is preferably made to stored values from the immediately preceding switching phase during those switching phases in which there is no current measurement. These stored values may be stored measured current values or other stored values determined from these values. In any case, a value is used which refers to a current measurement in the preceding switching phase. The current measurement within this switching phase may moreover be a peak-value determination or current averaging or else a current measurement (possibly averaged over a relatively short range) at a specific point in time within the switching phase, for example within its midpoint. In this case, the current measurements therefore take place in a period of time which is relatively small compared to the length of the switching phase.

In this context it is necessary to clarify the fact that the term "the switching phases of alternating polarity of the currents" relates to the lamp currents and thus also to the (half-bridge) converter switching phases and not to the step-down converter switching phases (at a much higher frequency). The currents through the switching transistors themselves do, however, alternate also as a consequence of the step-down converter operation. In relation to the current polarity change as a result of the step-down converter operation, measurements can be carried out at those points in time within the (half-bridge) converter switching phases at which the correct (always the same) polarity is present, and/or the voltage across the measuring resistor can advantageously be tapped off via a capacitive low-pass filter (RC low-pass filter). A certain averaging or smoothing over time is produced by the low-pass filter, with the result that higher-frequency components do not disrupt the evaluation. On the other hand, the low-pass filter need not be designed such that an average value is determined over the entire switching phase (in the sense of polarity commutation in the lamp).

BRIEF DESCRIPTION OF THE DRAWINGS

The invention will be explained in more detail below with reference to an exemplary embodiment. The individual features illustrated here may also be essential to the invention in other combinations. In particular, the description above and below always relates both to the apparatus aspect and the method aspect of the invention.

DETAILED DESCRIPTION OF THE INVENTION

Figure 1:
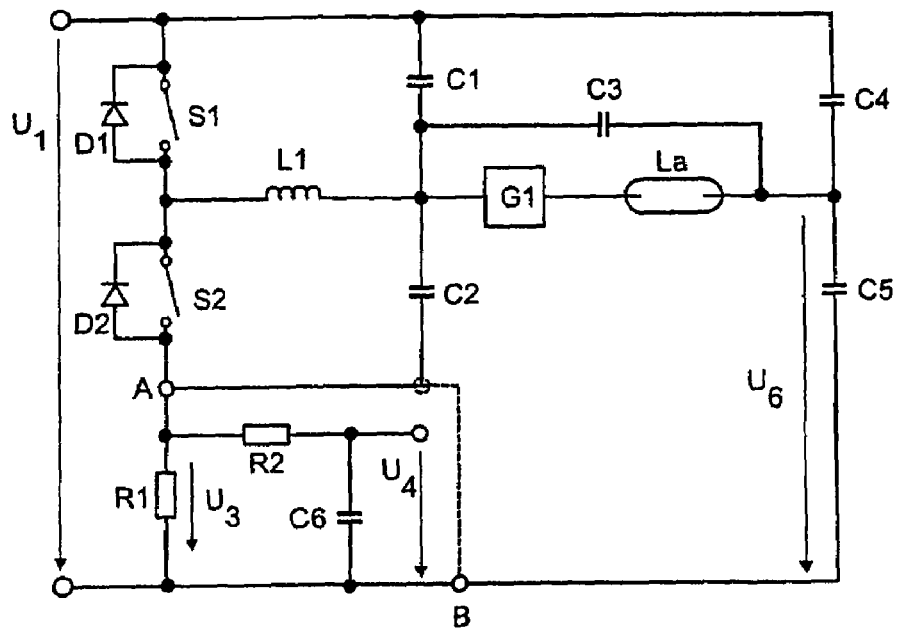
FIG. 1 shows a schematic circuit diagram of a ballast according to the invention.

FIG. 1 shows a half-bridge topology known per se having two switching transistors $S_1$ and $S_2$. Said switching transistors $S_1$ and $S_2$ are connected in series between two supply branches, between which an intermediate circuit voltage $U_1$ is applied. The intermediate circuit voltage $U_1$ is produced by means of rectification of a system voltage with corresponding filtering and by means of power factor correction with the aid of a step-up converter.

Owing to an alternating switching operation of the half-bridge transistors $S_1$ and $S_2$, a center tap between them is switched to and fro between the potentials of the supply branches. Correspondingly, a high-frequency alternating potential corresponding to this switching operation is applied to the left-hand connection of an inductor $L_1$ illustrated in FIG. 1. The inductor $L_1$ is connected in series with a high-pressure discharge lamp, a block $G_1$, which is connected therebetween, representing a starting circuit known per se. This starting circuit produces a starting pulse for the purpose of starting the lamp in a manner which is of no more interest to the invention by means of capacitor discharge and step-up transformation. The right-hand connection of the lamp is connected to the two supply branches via two coupling capacitors $C_4$ and $C_5$. The coupling capacitors $C_4$ and $C_5$ ensure that the right-hand connection of the lamp has a potential which is midway between the potentials of the supply branches. The circuit is thus capable of producing half the intermediate circuit voltage across the lamp. A filter capacitor $C_3$ is connected in parallel with the lamp. A tap between the lamp inductor $L_1$ and the starting circuit $G_1$ is connected in each case to the supply branches via two filter capacitors $C_1$ and $C_2$. The positions of the filter capacitors $C_1$, $C_2$ and $C_3$ do not necessarily have to be present at the same time. It is also possible for only one or two of the filter capacitor positions to be occupied. The filter capacitor $C_2$ may moreover also be connected to point B instead of point A.

During the actual operation of a high-pressure discharge lamp, an operating voltage of an order of magnitude of 80 V-150 V is necessary which is actually less than half the intermediate circuit voltages usually available. In this case, the half-bridge transistor $S_1$ is therefore interrupted in a clocked manner during a switching phase in which it is on, for example, in order to produce a step-down converter operation together with the inductor $L_1$ during this switching phase. As a result, a desired lamp operating voltage can be set by the step-down converter operation.

The diodes $D_1$ and $D_2$ are freewheeling diodes, which may also be embodied by the body diodes of field-effect transistors $S_1$ and $S_2$.

FIG. 1 also shows a current-measuring resistor $R_1$ between the (lower) connection, which is nearer to the reference potential in the figure, of the lower switching transistor $S_2$ and the reference potential on the lower supply branch itself. The measured voltage $U_3$, which is averaged via a capacitive low-pass filter comprising the resistor $R_2$ and the capacitor $C_6$, drops across this measuring resistor $R_1$. The averaged voltage $U_4$ is supplied to the evaluation process by a digital microcontroller control device (not illustrated here).

The switching position of the measuring resistor $R_1$ is on the one hand connected in series with the two switching transistors $S_1$ and $S_2$ and, on the other hand, directly to the reference potential (internal ground). It is thus particularly simple to evaluate the voltage $U_4$ in relation to the reference potential.

Variants of the circuit in FIG. 1 are naturally also conceivable. For example, instead of one lamp inductor, two lamp inductors may be present which are connected jointly to the starting circuit $G_1$, but are connected separately to the switching transistors, i.e. one to the lower connection of the upper switching transistor $S_1$ and the other one to the upper connection of the lower switching transistor $S_2$. In this case, the freewheeling diodes $D_1$ and $D_2$ could also be cross-connected, i.e. the freewheeling diode for the lower switching transistor $S_2$ to the upper connection of the lower switching transistor $S_2$ and from there to the upper supply potential branch and, conversely, the freewheeling diode for the upper switching transistor $S_1$ from the lower connection of the upper switching transistor $S_1$ up to the lower connection of the lower switching transistor $S_2$.

Figure 2:
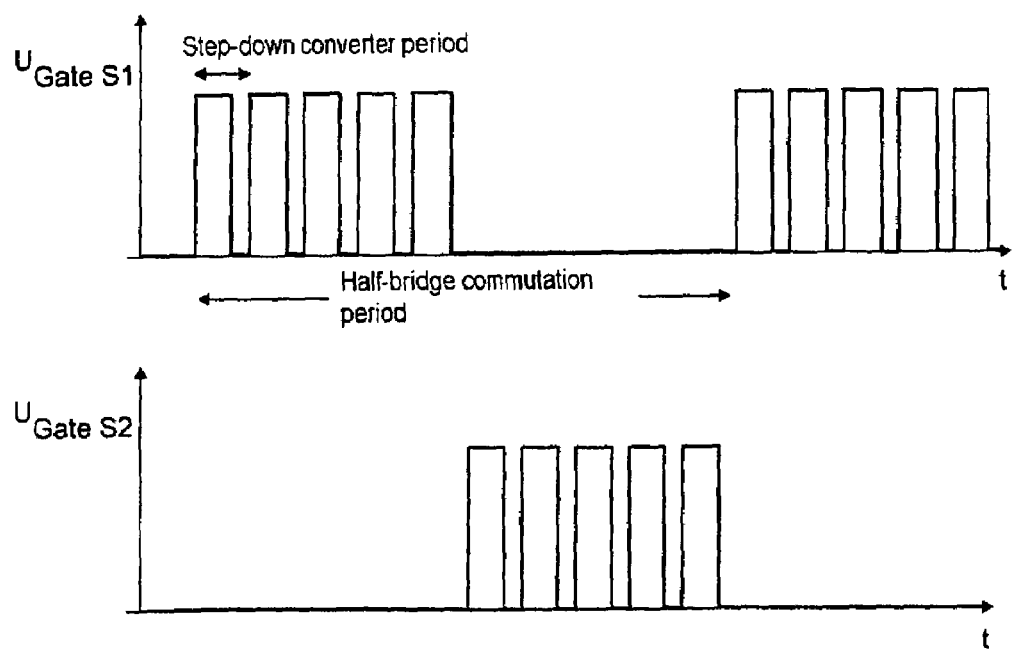
FIG. 2 shows a schematic time profile diagram for illustrating the clocking of switching transistors of the ballast shown in FIG. 1.

FIG. 2 shows a schematic illustration of the clocking of the switching operation of the two transistors $S_1$ and $S_2$ in FIG. 1. The upper part represents the upper transistor $S_1$, and the lower part represents the lower transistor $S_2$. It can be seen that in this case two periods occur, to be precise firstly a longer period between the pulse bursts and secondly a shorter period within the pulse bursts. In qualitative terms, this corresponds to the above-described combination of step-down converter operation and half-bridge function, the short period representing the step-down converter operation, and the longer period representing the half-bridge function.

Figure 3:
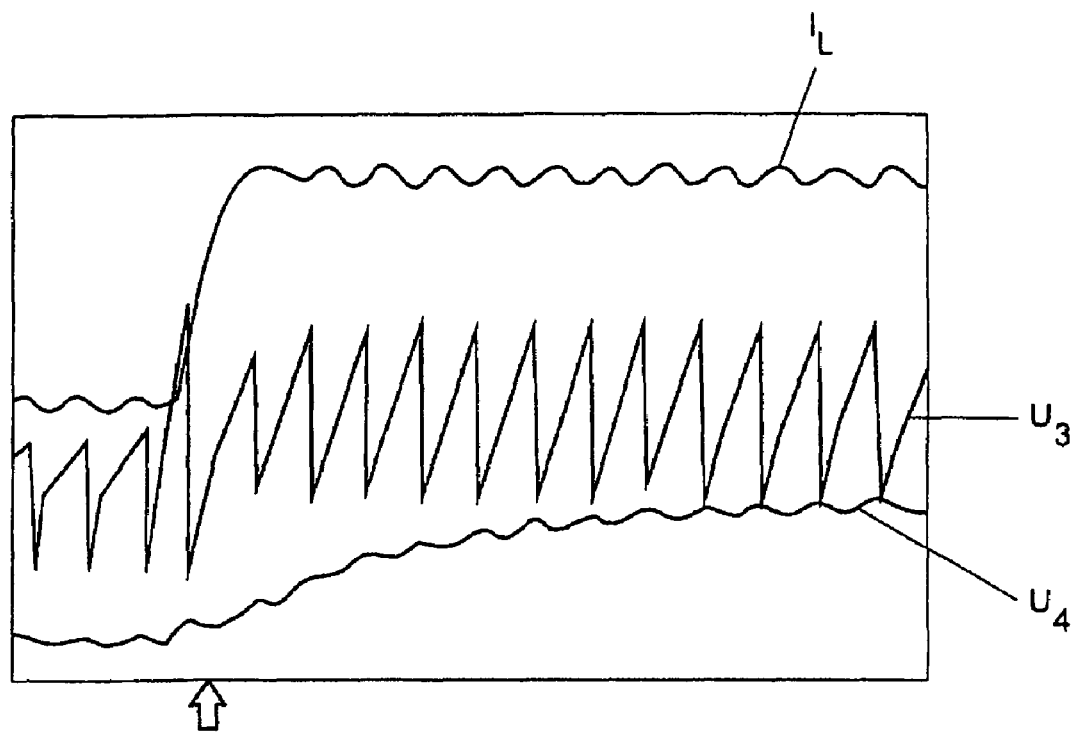
FIG. 3 shows measurement diagrams for operating the ballast shown in FIG. 1 in the event of clocking as shown in FIG. 2.

FIG. 3 shows the actually measured signals on a ballast shown in FIG. 1. In this case, $I_L$ denotes the lamp current in the upper region of the diagram, while the voltages $U_3$ and $U_4$ shown in FIG. 1 are represented in the center or in the lower region of the diagram. In the region of the arrow drawn beneath the diagram, a half-bridge commutation operation takes place. Before the arrow, there is a switching phase with the switching transistor $S_2$ open, while in the switching phase after the arrow, the upper switching transistor $S_1$ is open. The respective other switching transistor then operates using the step-down converter function.

Before the arrow, $U_3$ has a low negative average value over time and is of no importance for the measurement. After the arrow, the average value is noticeably higher in the positive region. It can be seen in particular that the value, which has been low-pass-filtered by $R_2$ and $C_6$, of $U_4$ rises after the arrow and in the new switching phase and remains at a specific value. The saw-tooth-like structure of the voltage $U_3$, which can be seen in the smoothed voltage $U_4$ only as residual ripple, corresponds to the step-down converter function, i.e. charging operations of the lamp inductor $L_1$ and corresponding charge currents with a linear rise. The step-down converter function essentially produces a DC voltage across the lamp as a result of the smoothing by the lamp inductor $L_1$ and by the filter capacitors $C_1$-$C_3$, and in turn a direct lamp current $I_L$ results from this DC voltage, as shown clearly in the upper region of the diagram. The rise in the voltage $U_4$, which is slightly slower in comparison, is explained by the delaying effect of the low-pass filter comprising $R_2$ and $C_6$.

In fact, the voltage $U_4$ is detected approximately at the midpoint in the relevant switching phase and used for evaluation purposes. For this purpose, with the knowledge of the temporal parameters of the step-down converter operation, the required duty ratio for the half-bridge converter function (i.e. half-bridge commutation operations) of the switching transistors $S_1$ and $S_2$ is calculated from $U_4$ in the microcontroller. In this case, the lamp current is regulated to a predetermined desired lamp current value. If the corresponding switch-on and/or switch-off times and/or the duty ratio are known, these are stored and are used as the basis for the operation up to the next measurement in the next-but-one switching phase or the next switching phase of the same polarity. This is to a certain extent an intermittent regulating operation.

Overall, the invention thus makes it possible to detect or regulate or set the lamp current in a cost-effective manner which is simple in terms of control and component complexity.

The invention claimed is:

1. An electronic ballast for operating a high-pressure discharge lamp (L) having a converter having at least two switching transistors ($S_1$, $S_2$) for the purpose of producing a supply power for the lamp (L) using a switching operation for the switching transistors ($S_1$, $S_2$) having a first switching phase and a second switching phase, the first switching phase having only a first polarity, the second switching phase having only a second alternate polarity, characterized by a current-measuring device ($R_1$, $R_2$, $C_6$) having a measuring resistor ($R_1$), which is connected in series with at least one of the switching transistors ($S_1$, $S_2$) and is designed to carry out current measurements only during a selected one of the first switching phase and the second switching phases of the converter.

2. The ballast as claimed in claim 1, in which the converter is a half-bridge converter having precisely two switching transistors ($S_1$, $S_2$).

3. The ballast as claimed in claim 2, in which the lamp (L) is connected on the one hand to a center tap between the two switching transistors ($S_i$, $S_2$) of the half-bridge converter and, on the other hand, via a capacitive coupling ($C_4$, $C_5$), to at least one of the supply potentials of the half-bridge converter.

4. The ballast as claimed in claim 2, which is designed such that the half-bridge converter is operated intermittently as a step-down converter within the switching phases.

5. The ballast as claimed in claim 1, which is designed such that values determined from current measurements of the preceding switching phase during the switching phases with no current measurements are stored.

6. The ballast as claimed in claim 1, in which a voltage across the measuring resistor ($R_1$) is tapped off via a capacitive low-pass filter ($R_2$, $C_6$).

7. The ballast as claimed in claim 1, in which the current measurements are carried out in each case in a portion of the switching phases of the converter, the portion being less than the first switching phase or the second switching phase.

8. A method for operating a high-pressure discharge lamp (L) having a ballast, in which a supply power for the lamp (L) is produced by a converter having at least two switching transistors ($S_1$, $S_2$), the switching transistors ($S_1$, $S_2$) being operated with switching phases of alternating polarity of the currents through the lamp (L), characterized in that, with the aid of a current-measuring device ($R_1$, $R_2$, $C_6$), current measurements are carried out via a measuring resistor ($R_1$) of the current-measuring device ($R_1$, $R_2$, $C_6$) which is connected in series with at least one of the switching transistors ($S_1$, $S_2$), only during a selected one of a first switching phase and a second switching phases of the converter, the first switching phase having only a first polarity and the second switching phase having only a second alternate polarity.

* * * * *